Sept. 27, 1960  F. F. DEHN  2,953,852
FOLIAGE TRIMMING DEVICE
Filed Aug. 12, 1958  2 Sheets-Sheet 2
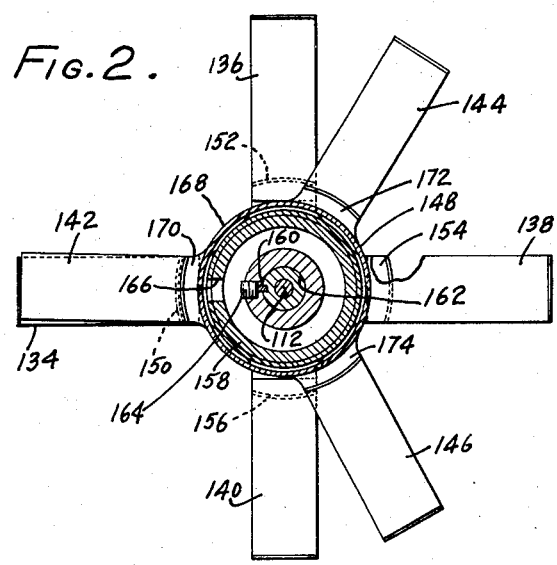
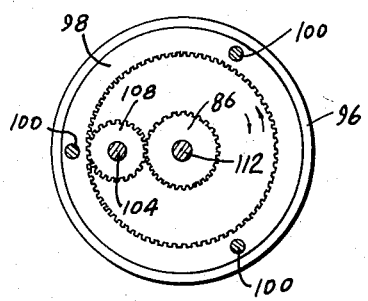
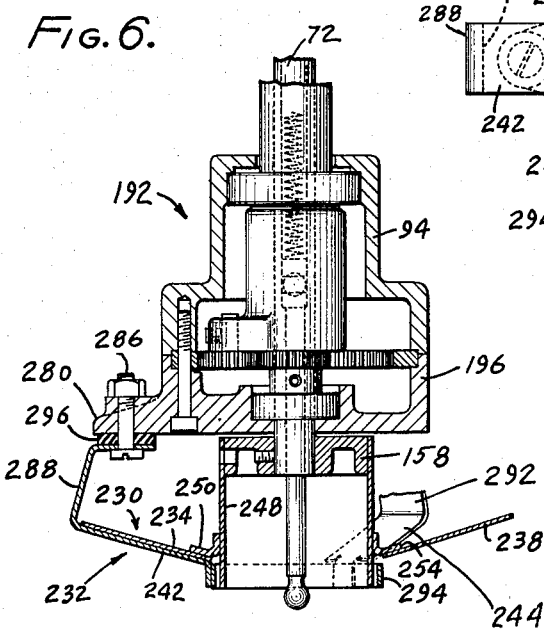
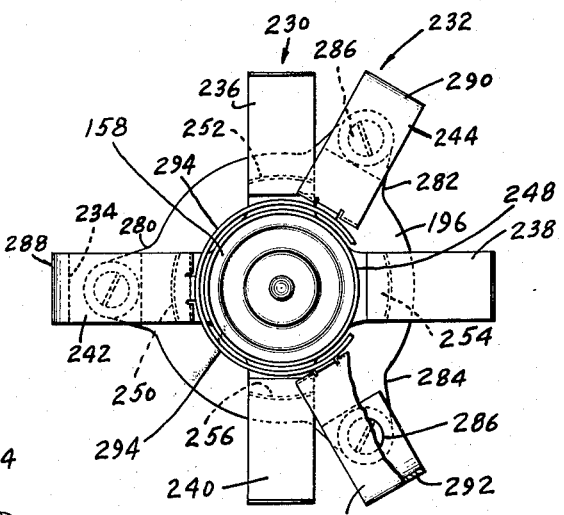
*INVENTOR.*
FREDERICK F. DEHN
BY
Orville R. Leidner
*AGENT*

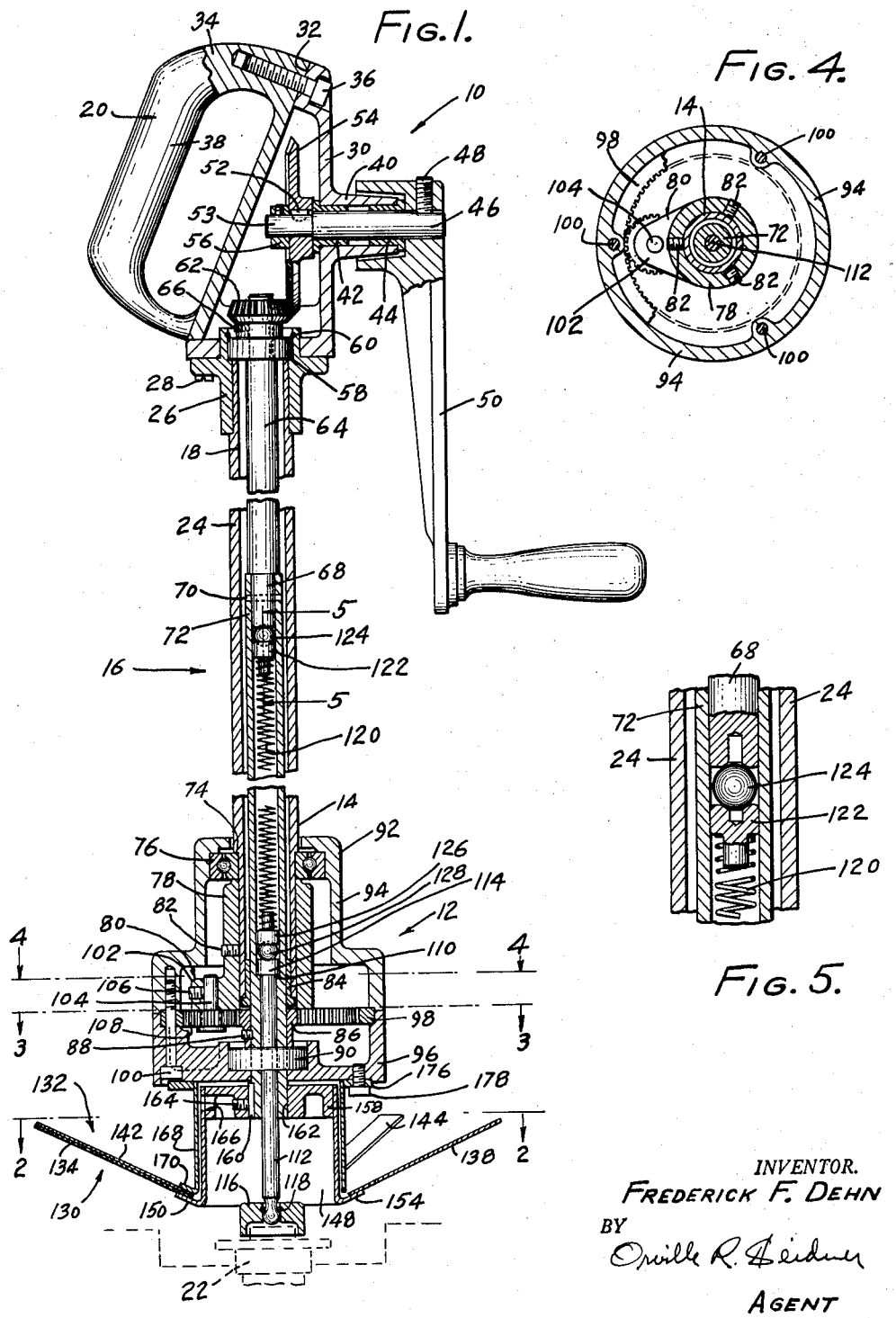

United States Patent Office 2,953,852
Patented Sept. 27, 1960

2,953,852

FOLIAGE TRIMMING DEVICE

Frederick F. Dehn, 504 N. Segovia, San Gabriel, Calif.

Filed Aug. 12, 1958, Ser. No. 754,560

17 Claims. (Cl. 30—205)

This invention relates to foliage trimming devices in general, and in particular relates to a device adapted to trimming the grass around a lawn sprinkler head set in the ground adjacent or within a domain of lawn.

Grass cutters and mowers of a large number of types are available to the homeowner and the professional gardner. Many of such are adapted to trimming the grass at the edge of a lawn where the grass may have a tendency to grow out and spread over a driveway, curbing, sidewalk, and the like. Yet such known devices are ill-adapted to cope with the problem of grass encroaching a lawn sprinkler head.

Essentially, the problem boils down to that of trimming the grass back so that the spray of water, which emits usually at an angle of 45 degrees or less from the sprinkler head, is unimpeded by the grass adjacent thereto. An incidental problem is that of trimming the grass evenly around the head in order that the lawn, which usually has a large number of sprinkler heads set at spaced intervals, will present a pleasing appearance to the homeowner and passersby. The device of the present invention solves these problems with a simple, compact apparatus.

It is therefore a primary object of the invention to provide a foliage trimming device, and specifically a grass cutter, which will trim symmetrically all around a sprinkler head so that the grass will be trimmed back a sufficient amount so as to permit unimpeded spray of water at an angle from the head.

It is a further object to provide a grass trimmer comprising cutter blades adapted to be disposed adjacent the sprinkler head, there being a support means for the blades having an attachment through an elongate member to handle means adapted to hold the device in position for trimming. It is another object to provide the device with a simple power application means adjacent the handle, the power means being adapted to actuate one, but preferably both, of the cutter blades for accomplishing the trimming operation.

It is a still further object to provide a device of relatively simple and compact structure, arranged for ease of manufacture and assembly, and thereby adapted to low cost sale in a favorable and receptive market.

It is a particular object to provide a grass cutter device comprised of blade support means and power application means spaced apart by an elongated member, the member including a hollow tubular element secured to a housing structure for the power application means at one end and attached to the blade support means at the other end, said element enclosing means to transmit power from the application means to the cutter means at the other end, said cutter means having a set of blades rotatable in one direction and a complementary set of blades rotatable in the other direction, said blade sets being generally angularly disposed to the axis of the elongate member.

It is an object to provide a device as aforesaid first above in which a rod-like member extends along the axis of the elongate member from said blade support means, the rod-like member being arranged to engage a sprinkler head in order that the cutter means may trim the grass adjacent thereto upon application of power by the power application means.

Other and further objects will be apparent from a consideration of the description of the invention wherein preferred embodiments are described in connection with the accompanying drawings without intent to limit the scope to the specific structures shown and described. Referring to the drawings, Fig. 1 shows an elevation sectional view of the invention in preferred form;

Fig. 2 shows a view taken on the line 2—2 of Fig. 1;

Fig. 3 shows a view taken on the line 3—3 of Fig. 1;

Fig. 4 shows a view taken on the line 4—4 of Fig. 1;

Fig. 5 shows an enlarged fragmentary view taken on line 5—5 of Fig. 1;

Fig. 6 shows a view of an alternate embodiment, similar to the lower portion of Fig. 1; and Fig. 7 shows a bottom view of the structure of the alternate embodiment illustrated in Fig. 6.

Referring to Fig. 1, the grass trimming device 10 is shown as comprising a support means 12 having one end 14 of an elongate member 16 attached thereto in a manner which will be described later. The other end 18 of the member 16 has secured thereon the handle means 20, the latter being adapted to hold the device 10 in cutting position over the sprinkler head 22.

The elongate member 16 comprises a tubular element 24 provided with a top bearing flange 26 secured thereto, as by a press fit. Secured on the upper end of the flange 26 by a plurality of cap screws, one of which is shown at 28, is the gear housing 30 which is provided with an oblique face 32 to which the housing cover 34 is secured by means of cap screws, one being shown at 36. The handle means 20 is comprised of the handle 38 forming an integral part of the cover 34.

A boss 40 is formed on the side of the housing 30 and is bored to receive a pair of sleeve bearings 42 and 44 within which is disposed the crankshaft 46 which has secured on the outer end thereof, as by a setscrew 48, the crank 50 arranged to be manually operated by one hand while the device 10 is held stationary with the other hand by means of the handle 38. A Woodruff key 52 is disposed intermediate the reduced portion 53 of the other end of the shaft 46 and a driving bevel gear 54 which is secured on the portion 53 of the shaft 46 by a collar 56.

The top bearing flange 26 is provided with a bore within which is disposed the anti-friction bearing 58 secured therewithin by a snap ring 60. A bevel gear 62, in driven relationship to the driving gear 54, is disposed on the top end of a drive shaft 64 and secured thereto by means of a setscrew 66, or the like. The drive shaft extends downwardly within the tubular element 24. A reduced diameter portion 68 at the lower end of the shaft 64 is drilled to receive a dowel pin 70 which also extends through the wall of the lower hollow shaft 72 whose internal diameter is such that it may be pressed on the reduced diameter portion 68 of the shaft 64 with a snug fit.

The lower end of the tubular element 24 is shouldered at 74, against which shoulder is received the inner race of a ball bearing 76. Below the inner race of the bearing 76, and holding it against the shoulder 74, is the extended annular portion 78 of the planet spider 80, the set screws 82 serving to secure the spider 80 to the lower end of the tubular element 24 which is terminated by a sleeve bearing 84 pressed within the lower end thereof.

The hollow shaft 72 extends downwardly, journaled in the sleeve bearing 84. Below the bearing 84 is a sun gear 86 secured adjacent the lower end of the shaft 72 by means of a set screw 88, and below the gear 86 the shaft 72 is received in the inner race of an anti-friction bearing 90.

The support means 12 includes a housing 92 within which the bearings 76 and 90 are disposed. The housing 92 comprises a bell-shaped bearing support member 94 at the upper side of the housing 92 and a cup-shaped bearing support member 96 at the lower side thereof. A ring gear 98, disposed within grooved portions of the open ends of the bell and cup members 94 and 96, is retained therewithin and the members 94 and 96 are clamped together by means of three capscrews 100.

The planet spider 80 is secured on the tubular element 24 and is provided with a boss portion 102 having a bore within which is disposed the gear pin 104 secured therewithin by the setscrew 106. The pin 104 serves to retain a planet gear 108 in fixed relationship between the sun gear 86 and the ring gear 98.

As noted hereinabove, the shaft 72 is hollow, the lower end thereof being provided with an internal shoulder 110. A pilot shaft 112 is disposed within the lower end of the hollow shaft 72 and is provided with a head 114 which abuts against the shoulder 110. Disposed on the lower rounded end of the pilot shaft 112 is a cup-shaped adapter 116 secured thereon by a retainer spring 118 received in a groove in the adapter 116.

As shown, the adapter 116 is arranged to be disposed over a sprinkler head 22. In some of the older types of sprinkler heads the upper central portion is depressed. For use on this type head the adapter is removed by a slight pull, whereupon the spring 118 gives radially to permit the adapter's removal. The rounded end of the pilot shaft 112 is adapted to be inserted in the depressed central portion of the aforesaid older types of sprinkler heads.

The pilot shaft 112 is urged outwardly by means of a compression spring 120 disposed in the interior of the hollow shaft 72 intermediate the lower end of the reduced diameter portion 68 of the drive shaft 64 and the head 114 of the pilot shaft 112. A thrust button 122 on the upper end of the spring 120 bears against a ball 124 adjacent the lower end of shaft 64, and a thrust button 126 and ball 128 are disposed between the lower end of the spring 120 and the head 114.

When the device 10 is disposed uprightly with the adapter 22 over a sprinkler head, the height of the device above the ground may be varied to suit by means of the compression spring and the pilot shaft which is slidably disposed within the hollow shaft, height variation being had by means of the handle 38. As the handle is pushed down, the spring 120 is compressed by the pilot shaft 112, the latter being returned to its normal position by the spring when the device 10 is removed from the sprinkler head.

Cutter means are disposed on the lower end of the device 10, comprising cutter blade sets 130 and 132. The lower set 130 is comprised preferably of four blades 134, 136, 138, and 140; while upper set 132 is comprised preferably of three blades 142, 144, and 146. The interior cutter head 148 is cylindric in shape and formed at its lower end with four angularly outstanding lips 150, 152, 154, and 156 to which the ends of the blades 134, 136, 138, and 140, respectively, are secured, as by brazing. The upper end of the head 148 has a hub 158 pressed therewithin and secured.

Hollow shaft 72 is provided at its extreme lower end with a key 160 which is received within a keyway formed longitudinally in the bore 162 of the hub 158, the shaft 72 being slidably fixed within the bore 162. A setscrew 164 is threadably received in the hub 158, access thereto being had by way of a radial passageway 166. Slidable movement of the hub 158 on the shaft 72 permits adjustment of the cutting relationship of the cutter sets 130 and 132, after which the hub is secured by the setscrew.

The exterior cutter head 168 is likewise cylindric in shape and formed at its lower end with three angularly outstanding lips 170, 172, and 174 to which the ends of the blades 142, 144, and 146, respectively, are brazed or otherwise secured. It will be observed that the angular disposition of the lips 170, 172, and 174 on the head 168 is identical with that of the lips 150, 152, 154, and 156 on the head 148 in order that shearing action occurs between the cutter blades as the heads are rotated about their common axis relative to each other. The upper end of the head 168 is provided with a flange 176 which adapts the head 168 to be secured to the lower face of the cup-shaped member 96 by means of screws spaced intermediate the capscrews 100, one such screw being shown at 178.

The foregoing completes the description of the device as shown in Figs. 1–5, and the operation will now be explained.

The device 10 is held by the handle 38 in a vertical position with the adapter 116 disposed on a sprinkler head. The device may then be pushed down lightly until the cutter blades are disposed at the proper cutting height after which manual operation of the crank 50 imparts rotary power through the gears 54 and 62 to the drive shaft 64 and hence to the hollow shaft 72. Since the pilot shaft 112 is only loosely disposed within shaft 72, it will not necessarily turn with. Rotation of shaft 72 causes the cutter blade set 130 to rotate in one direction at a speed dependent on the rotation rate of the crank 50 and the gear ratio of the gears 54 and 62. Preferably the gear ratio is of the order of about 2.75:1, although any other ratio may be used as preferred.

Rotation of the shaft 72 also causes the sun gear 86 to rotate at the same rate. This gear 86 is in mesh with the planet gear 108, but since this latter is fixed as to revolution about the axis of the shaft 72 (by reason of the fixation of the planet spider 78 to the tubular element 24, which in turn is fixed to the handle means 20) it will merely rotate on the axis of the gear pin 104 and impart its rotation to the ring gear 98. Rotation of the latter about its axis will be in accord with the ratio of sun gear 86 to ring gear 98, which preferably is of the order of about 1:3.

Since the ring gear 98 is fixed within the housing 92, the latter will rotate, carrying with it the cutter blade set 132. It will be observed that blade set 132 rotates at a slower speed and in the opposite direction to that of the blade set 130, although it will be apparent that a different arrangement of gears within the housing could be effected for any rotational and speed relationship. However, the rotational and speed relationship of the cutter sets as shown and described have been shown to effect very good cutting action of a variety of grasses of different heights. The number of blades in each set also has a direct bearing on good cutting action. Apparently the most desirable combination of blade numbers on each set, together with rotational and speed relationship, is predicated to a large extent on the optimum turning rate of the crank so as not to cause the blades to strike the grass stems out of the way of the blade shearing action. The combination as aforesaid has proven quite successful.

Referring now to Figs. 6 and 7, there is shown an arrangement in which the action of the upper and lower blade sets is just the reverse of that of the previous description. That is, the upper blade set is connected directly with the power shaft while the lower blade set is driven by the housing. In this embodiment there are blade sets 230 and 232 comprised, respectively, of blades 234, 236, 238, and 240, and blades 242, 244, and 246.

The interior cutter head 248 is shaped cylindrically, similarly to that of Fig. 1, and is provided with four blade lip brackets 250, 252, 254, and 256 secured thereto as by spot welding, brazing, or the like, with the ends of the blades 234, 236, 238, and 240, respectively, brazed thereto. Head 248 is secured to the hub 153, as aforesaid in connection with Figs. 1–5, and is driven thereby.

The bell member 94 of the housing 192 is identical to that shown in Figs. 1–5, while the lower cup-shaped bearing support member 196 differs from its counterpart in Figs. 1–5 by being provided with three equally spaced radially outstanding lugs 280, 282, and 284. Secured to the lugs, as by bolts 286, are the angled portions 288, 290, and 292 extending upwardly from the blades 242, 244, and 246, respectively. The inner ends of central portions of these blades are bent downwardly and secured, preferably by brazing, to a blade spacing ring 294.

The upper inwardly bent ends of the angled portions 288, 290, and 292 are secured as aforesaid by bolts 286 to the lugs 280, 282, and 284, there being provided washer means 296 interposed therebetween for proper spacing.

All the other elements in the housing 192 are the same, and disposed in the same relationship as described hereinabove in connection with Figs. 1–5. It should be pointed out that the embodiment shown and described employs but a single planet gear for the sake of economy. However, it will be apparent that a plurality of such gears could be employed if the duty of the device required it.

With regard to the operation of the embodiment shown in Figs. 6 and 7, it will be noted that the upper blade set 230 (comprising four blades) is caused to rotate at the speed of hollow shaft 72 whereas the lower blade set 232 (comprised of three blades) rotates with and at the speed of the housing 192. It will be noted that the angled portions 288, 290, and 292 constitute effective supports for the outer ends of the blades 232, 234, and 236, while the inner ends thereof obtain mutual supporting relationship by way of the ring 294.

In some respects then, the embodiment of Figs. 6 and 7 might be considered advantageous over that of Figs. 1–5 by reason of the protective feature of the angled blade portions. However, it is at once apparent that narrow annular ring members could be brazed to the upper surfaces at the ends of the blades 142, 144, and 146 and to the lower surfaces at the ends of the blades 134, 136, 138, and 140, if desired to provide protection and mutual support. Such ring members obviously would not be undesirably wide in order not to interfere with the grass cutting operation of the device.

A further noteworthy point in connection with this device is that both edges of all the blades are easily arranged for sharpening without having to dismantle the device. Sharpening of both blade edges adapts the device to operation by both right- and left-handed persons since the handle 38 may be held by either hand and the crank 50 turned in either direction.

I claim:

1. A foliage trimming device, comprising: support means defining an axis; first and second bladed members supported by said support means adjacent thereto in foliage trimming cooperative relationship, one of said bladed members being rotative about said axis; an elongate member defining an axis coincident with said axis defined by said support means and having an attachment at one end thereof to said support means; handle means at the other end of said elongate member and adapted to dispose said device in a foliage trimming position; and means for applying power through at least a portion of said elongate member to one of said bladed members, whereby said one of said bladed members is actuated thereby and cooperates with the other of said bladed members to trim foliage when said bladed members are disposed adjacent a foliage domain.

2. A foliage trimming device, comprising: support means defining an axis; first and second bladed members supported by said support means adjacent thereto in foliage trimming cooperative relationship, said bladed members being rotative about said axis; an elongate member defining an axis coincident with said axis defined by said support means and having an attachment at one end thereof to said support means; handle means at the other end of said elongate member and adapted to dispose said device in a foliage trimming position; and means for applying power to both of said bladed members whereby both of said bladed members are actuated cooperatively with each other to trim foliage when said bladed members are disposed adjacent a foliage domain.

3. A foliage trimming device, comprising: support means defining an axis; first and second bladed members supported by said support means adjacent thereto in foliage trimming cooperative relationship, said bladed members being rotative about said axis; an elongate member defining an axis coincident with said axis defined by said support means and having an attachment at one end thereof to said support means; handle means at the other end of said elongate member and adapted to dispose said device in a foliage trimming position; and means for applying power to both of said bladed members through at least a portion of said elongate member, whereby both of said bladed members are actuated cooperatively with each other to trim foliage when said bladed members are disposed adjacent a foliage domain.

4. A foliage trimming device, comprising: support means defining an axis; first and second bladed members supported by said support means adjacent thereto in foliage trimming cooperative relationship, one of said bladed members being rotative about said axis; an elongate member defining an axis coincident with said axis defined by said support means and having an attachment at one end thereof to said support means; handle means at the other end of said elongate member and adapted to dispose said device in a foliage trimming position; and means adjacent said handle means for applying power through said elongate member to one of said bladed members, whereby said one of said bladed members is actuated thereby and cooperates with the other of said bladed members to trim foliage when said bladed members are disposed adjacent a foliage domain.

5. A foliage trimming device, comprising: support means defining an axis; first and second bladed members supported by said support means adjacent thereto in foliage trimming cooperative relationship, one of said bladed members being rotative about said axis; an elongate member defining an axis coincident with said axis defined by said support means and having an elongate hollow tubular element and an elongate shaft element interiorly disposed within said tubular element, one end of one of said elements having one of said bladed members secured thereto; handle means at the other end of said one of said elongate elements and secured to one of said elements and adapted to dispose said device in a foliage trimming position; and means adjacent said handle means for applying power to said one of said bladed members secured to said one end of one of said elements, whereby said one of said bladed members is actuated thereby and cooperates with the other of said bladed members to trim foliage when said bladed members are disposed adjacent a foliage domain.

6. A foliage trimming device, comprising: support means defining an axis; first and second bladed members supported by said support means adjacent thereto in foliage trimming cooperative relationship, one of said bladed members being rotative about said axis; an elongate member defining an axis coincident with said axis defined by said support means and having an elongate hollow tubular element and an elongate shaft element interiorly disposed within said tubular element, one end of said interior elongate shaft element having one of said bladed members secured thereto; handle means at the other end of said elongate member and adapted to dispose said device in a foliage trimming position, the opposite end of said tubular element having said handle means secured thereto; and means adjacent said handle means for applying power to the other end of said interior elongate shaft element and thereby to said one of said bladed members, whereby said one of said bladed members is actuated thereby and cooperates with the other of said bladed members to trim foliage when said bladed members are disposed adjacent a foliage domain.

7. A foliage trimming device, comprising: support means defining an axis; first and second bladed members supported by said support means adjacent thereto in foliage trimming cooperative relationship, said bladed members being rotative about said axis; an elongate member defining an axis coincident with said axis defined by said support means and having an attachment at one end thereof to said support means; handle means at the other end of said elongate member and adapted to dispose said device in a foliage trimming position; transmission means interposed between said bladed members; and means for applying power to one of said bladed members and through said transmission means to the other of said bladed members whereby both of said bladed members are actuated cooperatively with each other to trim foliage when said bladed members are disposed adjacent a foliage domain.

8. A foliage trimming device, comprising: support means defining an axis; first and second bladed members supported by said support means adjacent thereto in foliage trimming cooperative relationship, said bladed members being rotative about said axis; an elongate member defining an axis coincident with said axis defined by said support means and having an attachment at one end thereof to said support means; handle means at the other end of said elongate member and adapted to dispose said device in a foliage trimming position; transmission means interposed between said bladed members; and means for applying power through at least a portion of said elongate member to one of said bladed members and through said transmission means to the other of said bladed members, whereby both of said bladed members are actuated cooperatively with each other to trim foliage when said bladed members are disposed adjacent a foliage domain.

9. A foliage trimming device, comprising: support means defining an axis; first and second bladed members supported by said support means adjacent thereto in foliage trimming cooperative relationship, said bladed members being rotative about said axis; an elongate member defining an axis coincident with said axis defined by said support means and having an attachment at one end thereof to said support means; handle means at the other end of said elongate member and adapted to dispose said device in a foliage trimming position; transmission means interposed between said bladed members; and means adjacent said handle means for applying power through said elongate member to one of said bladed members and through said transmission means to the other of said bladed members, whereby both of said bladed members are actuated cooperatively with each other to trim foliage when said bladed members are disposed adjacent a foliage domain.

10. A foliage trimming device, comprising: support means defining an axis; first and second bladed members supported by said support means adjacent thereto in foliage trimming cooperative relationship, said bladed members being rotative about said axis; an elongate member defining an axis coincident with said axis defined by said support means and having an elongate hollow tubular element and an elongate shaft element interiorly disposed within said tubular element, one end of one of said elements having one of said bladed members secured thereto; handle means at the other end of said one of said elongate elements and secured to one of said elements and adapted to dispose said device in a foliage trimming position; transmission means interposed between said bladed members; and means adjacent said handle means for applying power to said one of said bladed members secured to said one end of said one of said elements and through said transmission means to the other of said bladed members whereby both of said bladed members are actuated cooperatively with each other to trim foliage when said bladed members are disposed adjacent a foliage domain.

11. A foliage trimming device, comprising: support means defining an axis; first and second bladed members supported by said support means adjacent thereto in foliage trimming cooperative relationship, said bladed members being rotative about said axis; an elongate member defining an axis coincident with said axis defined by said support means and having an elongate hollow tubular element and an elongate shaft element interiorly disposed within said tubular element, one end of said interior elongate shaft element having one of said bladed members secured thereto; handle means at the other end of said elongate member and adapted to dispose said device in a foliage trimming position, the opposite end of said tubular element having said handle means secured thereto; transmission means interposed between said bladed members; and means adjacent said handle means for applying power to the other end of said interior elongate element and thereby to said one of said bladed members and through said transmission means to the other of said bladed members whereby both of said bladed members are actuated cooperatively with each other to trim foliage when said bladed members are disposed adjacent a foliage domain.

12. A foliage trimming device comprising: first and second bladed members, said members being rotative and cooperatively disposed at an angle to their axis of rotation, said angle differing substantially from 90°; transmission means interposed between said first and second members; and means for applying power to one of said members and through said transmission means to the other of said members whereby both said members are cooperatively actuated contrarotatively to trim foliage when said bladed members are disposed adjacent a foliage domain.

13. A foliage trimming device comprising: first and second bladed members, said members being rotative and cooperatively disposed at an angle to their axis of rotation, said angle differing substantially from 90°, the number of blades on one of said members differing from the number of blades on the other of said members; transmission means interposed between said first and second members; and means for applying power to one of said members and through said transmission means to the other of said members whereby both said members are cooperatively actuated contrarotatively to trim foliage when said bladed members are disposed adjacent a foliage domain.

14. A grass trimming device for the area of a lawn adjacent a sprinkler head, comprising: first and second bladed members, said members being cooperatively disposed on an axis; adapter means disposed on said axis and arranged for centering said members adjacent a sprinkler head; transmission means interposed between said first and second members; and means for applying power to one of said members and through said transmission means to the other of said members whereby both said members are cooperatively actuated contrarotatively to trim grass around the sprinkler head when said bladed members are disposed with said adapter means centered over the sprinkler head.

15. A grass trimming device for the area of a lawn adjacent a sprinkler head, comprising: first and second bladed members, said members being cooperatively disposed on an axis, the number of blades on one of said members differing from the number of blades on the other of said members; adapter means disposed on said axis and arranged for centering said members adjacent a sprinkler head; transmission means interposed between said first and second members; and means for applying power to one of said members and through said transmission means to the other of said members whereby both said members are cooperatively actuated contrarotatively to trim grass around the sprinkler head when said bladed members are disposed with said adapter means centered over the sprinkler head.

16. A grass trimming device for the area of a lawn adjacent a sprinkler head, comprising: first and second bladed members, said members being rotative and cooperatively disposed at an angle to their axis of rotation, said angle differing substantially from 90°; adapter means disposed on said rotation axis and arranged for centering said members adjacent a sprinkler head; transmission means interposed between said first and second members; and means for applying power to one of said members and through said transmission means to the other of said members whereby both said members are cooperatively actuated contrarotatively to trim grass around the sprinkler head when said bladed members are disposed with said adapter means centered over the sprinkler head.

17. A grass trimming device for the area of a lawn adjacent a sprinkler head, comprising: first and second bladed members, said members being rotative and cooperatively disposed at an angle to their axis of rotation, said angle differing substantially from 90°, the number of blades on one of said members differing from the number of blades on the other of said members; adapter means disposed on said rotation axis and arranged for centering said members adjacent a sprinkler head; transmission means interposed between said first and second members; and means for applying power to one of said members and through said transmission means to the other of said members whereby both said members are cooperatively actuated contrarotatively to trim grass around the sprinkler head when said bladed members are disposed with said adapter means centered over the sprinkler head.

References Cited in the file of this patent

UNITED STATES PATENTS

| | | |
|---|---|---|
| 316,937 | Bell | May 5, 1885 |
| 728,068 | Young | May 12, 1903 |
| 1,021,605 | Hustage | Mar. 26, 1912 |
| 1,378,791 | Johanson | May 17, 1921 |
| 1,844,158 | Hain | Feb. 9, 1932 |
| 1,983,420 | Underwood | Dec. 4, 1934 |
| 2,549,280 | Allen | Apr. 17, 1951 |
| 2,555,428 | Tutle | June 5, 1951 |
| 2,699,605 | Setter | Jan. 18, 1955 |
| 2,757,453 | Brunson | Aug. 7, 1956 |
| 2,814,872 | Gerrans | Dec. 3, 1957 |
| 2,840,904 | Hutchins | July 1, 1958 |